US008783626B2

(12) United States Patent
Cross

(10) Patent No.: US 8,783,626 B2
(45) Date of Patent: Jul. 22, 2014

(54) LIGHT RAIL VEHICLE MONITORING AND STOP BAR OVERRUN SYSTEM

(75) Inventor: Brad Cross, McLeansboro, IL (US)

(73) Assignee: STC, Inc., McLeansboro, IL (US)

( * ) Notice: Subject to any disclaimer, the term of this patent is extended or adjusted under 35 U.S.C. 154(b) by 159 days.

(21) Appl. No.: 13/566,643

(22) Filed: Aug. 3, 2012

(65) Prior Publication Data

US 2013/0048795 A1 Feb. 28, 2013

Related U.S. Application Data

(60) Provisional application No. 61/514,692, filed on Aug. 3, 2011.

(51) Int. Cl.

| | |
|---|---|
| ***G06F 19/00*** | (2011.01) |
| ***G06G 7/70*** | (2006.01) |
| ***G06G 7/76*** | (2006.01) |
| ***G08G 1/00*** | (2006.01) |

(52) U.S. Cl.
USPC ........................................ 246/122 R; 701/117

(58) Field of Classification Search
USPC .................. 701/117, 20, 1, 19, 16, 505, 449; 246/122 R, 5, 131, 182, 167, 130, 163, 246/111, 125, 453, 473, 204, 122, 27, 246/187 B; 107/19, 70, 20
See application file for complete search history.

(56) References Cited

U.S. PATENT DOCUMENTS

| | | | | |
|---|---|---|---|---|
| 7,317,987 | B2 * | 1/2008 | Nahla | 701/301 |
| 2003/0236598 | A1 * | 12/2003 | Villarreal Antelo et al. | 701/19 |
| 2005/0107954 | A1 * | 5/2005 | Nahla | 701/301 |
| 2007/0219680 | A1 * | 9/2007 | Kumar et al. | 701/19 |

FOREIGN PATENT DOCUMENTS

| | | | |
|---|---|---|---|
| EP | 1 942 041 | A2 | 7/2008 |
| EP | 1942041 | B1 * | 11/2012 |
| WO | 2004/106133 | A2 | 12/2004 |
| WO | WO 2004106133 | A2 * | 12/2004 |

OTHER PUBLICATIONS

International Search Report, International Patent Application No. PCT/US12/49568, mailed on Feb. 26, 2013, 13 pages.
von Briesen, John, "Substituting GPS and Dead Reckoning for LRT Non-Vital Signal Elements," American Public Transportation Association Rail Conference, 2009, 4 pages.

* cited by examiner

*Primary Examiner* — Thomas Black
*Assistant Examiner* — Robert Payne
(74) *Attorney, Agent, or Firm* — Lewis, Rice & Fingersh, L.C.

(57) ABSTRACT

A satellite positioning location based control and monitoring system for light rail transit systems which enables transit personnel to track vehicle positions, progress and non-vital signals as light rail vehicles travel through their routes while eliminating the capital and maintenance costs associated with embedded light rail transit monitoring systems.

14 Claims, 9 Drawing Sheets

EMTRAC Event Log Report

DATE: 08/24/12
TIME: 12:45 PM

| Received Date | Int | Veh | Zone | Route | Cross | Dir | Hdg | Vel | Sig | Alarm | Signal History |
|---|---|---|---|---|---|---|---|---|---|---|---|
| 7/26/2012 11:59 AM | 15 | 081 | 29 | MAIN | BELL | N | 34 | 19 | | FALSE | |
| 7/26/2012 11:59 AM | 13 | 151 | 26 | MAIN | POLK | S | 214 | 23 | | FALSE | |
| 7/26/2012 11:58 AM | 16 | 081 | 31 | MAIN | LAND | N | 34 | 22 | | FALSE | |
| 7/26/2012 11:58 AM | 12 | 151 | 24 | MAIN | PARK | S | 215 | 18 | | FALSE | |
| 7/26/2012 11:58 AM | 17 | 081 | 33 | MAIN | ELLIS | N | 34 | 23 | | FALSE | |
| 7/26/2012 11:58 AM | 18 | 081 | 35 | MAIN | COLE | N | 34 | 17 | | FALSE | |
| 7/26/2012 11:58 AM | 47 | 182 | 77 | BAY | ALTON | N | 34 | 23 | | FALSE | |
| 7/26/2012 11:58 AM | 48 | 182 | 75 | BAY | ROSS | N | 34 | 12 | | FALSE | |
| 7/26/2012 11:57 AM | 46 | 171 | 74 | BAY | SUN | S | 214 | 16 | | FALSE | |
| 7/26/2012 11:57 AM | 11 | 151 | 22 | MAIN | LOME | S | 215 | 17 | | FALSE | |
| 7/26/2012 11:57 AM | 10 | 151 | 20 | MAIN | KILN | S | 215 | 20 | | FALSE | |
| 7/26/2012 11:57 AM | 57 | 131 | 91 | PALM | COVE | N | 351 | 12 | | FALSE | |
| 7/26/2012 11:57 AM | 9 | 151 | 18 | MAIN | POLK | S | 216 | 20 | | FALSE | |
| 7/26/2012 11:57 AM | 27 | 121 | 53 | MAIN | LAND | N | 22 | 21 | | FALSE | |
| 7/26/2012 11:57 AM | 25 | 141 | 50 | MAIN | HULL | S | 214 | 18 | | FALSE | |
| 7/26/2012 11:57 AM | 8 | 151 | 16 | MAIN | RUSK | S | 216 | 20 | | FALSE | |
| 7/26/2012 11:57 AM | 45 | 171 | 392 | BAY | PACE | S | 235 | 21 | | FALSE | |
| 7/26/2012 11:57 AM | 20 | 081 | 39 | MAIN | PIER | N | 35 | 17 | | FALSE | |
| 7/26/2012 11:57 AM | 49 | 182 | 79 | BAY | STAR | N | 34 | 17 | | FALSE | |
| 7/26/2012 11:57 AM | 21 | 081 | 41 | MAIN | GRAY | N | 34 | 18 | | FALSE | |
| 7/26/2012 11:57 AM | 44 | 171 | 72 | BAY | LAKE | S | 217 | 16 | | FALSE | |
| 7/26/2012 11:57 AM | 7 | 151 | 14 | MAIN | CAPE | S | 216 | 26 | | FALSE | |
| 7/26/2012 11:57 AM | 6 | 151 | 12 | MAIN | TEAL | S | 215 | 23 | | FALSE | |
| 7/26/2012 11:57 AM | 22 | 081 | 43 | MAIN | WEST | N | 34 | 15 | | FALSE | |
| 7/26/2012 11:57 AM | 24 | 141 | 48 | MAIN | ELM | S | 214 | 25 | | FALSE | |
| 7/26/2012 11:57 AM | 61 | 051 | 96 | BAY | HALL | S | 178 | 12 | | FALSE | |
| 7/26/2012 11:57 AM | 5 | 151 | 10 | MAIN | OAK | S | 215 | 16 | | FALSE | |
| 7/26/2012 11:57 AM | 50 | 182 | 81 | BAY | JADE | N | 35 | 22 | | FALSE | |
| 7/26/2012 11:57 AM | 54 | 022 | 90 | BAY | GLEN | S | 170 | 13 | | FALSE | |
| 7/26/2012 11:56 AM | 42 | 171 | 70 | BAY | ASH | S | 215 | 14 | | FALSE | |

FIG. 4

LIGHT RAIL VEHICLE MONITORING AND STOP BAR OVERRUN SYSTEM

CROSS REFERENCE TO RELATED APPLICATION(S)

This Application claims the benefit of U.S. Provisional Patent Application Ser. No. 61/514,692, filed Aug. 3, 2011, the entire disclosure of which is incorporated herein by reference.

BACKGROUND OF THE INVENTION

1. Field of the Invention

This disclosure is related to the field of systems for the monitoring of mass transit systems, such as light rail transit, trains, trams and metros, whose routes are integrated with and/or intersect roads, pedestrian crossways or other vehicular or human passageways for ingress or egress.

2. Description of Related Art

Due, in part, to an rising concern over increasing greenhouse gas emissions associated with individual motor vehicle commutes, the ever-escalating prices of gasoline and the increased traffic flow and congestion associated with rising metropolitan populations, mass transit systems have generally seen an increase in ridership in recent years. With this rising ridership comes an increase in the number of mass transit units and routes and, thus, an increased presence of mass transit commuter vehicles on or near motor or pedestrian throughways. For example, the Houston METRO operates about seven and one half (7.5) miles of surface rail line for light rail transit (LRT). This LRT system is integrated with and operates on Houston city streets and currently carries about 40,000 riders a day.

Integrating the increase in ridership and mass transit units on LRT lines with existing motor vehicle and pedestrian streets and walkways creates obvious logistical and operating concerns. Accordingly, reliable and effective maintenance and monitoring systems for operating mass transit systems, such as LRT, are becoming increasingly important. Systems with the capability of monitoring non-vital signal elements of street-running LRT systems with increased reliability and decreased operating and maintenance costs are therefore desirable.

Important non-vital signal elements to be monitored by such systems include, but are not limited to, on-board and station announcements (i.e., communication to passengers as to when an Light Rail Vehicle (LRV) is approaching a station or stop); traffic signal prioritization and pre-emption; grade crossing initiations; automatic vehicle location (AVL); route selection at interlockings; maximum speed limit control; headway maintenance; and indications of a LRV on the wrong track proceeding in the wrong direction. Another non-vital signal element that is of particular concern is intersection stop bar infringement. An intersection stop bar is the defined stopping point for a vehicle or individual at an intersection. Stop bars can be designated by broad white lines on the rail or road or more tangible barriers such as retractable gates or bars. With the increasing interaction between LRVs and motor vehicle and pedestrian traffic flow at intersections, the number of incidents in which an LRV operator has passed a bar stop signal and improperly proceeded into the intersection, thus causing an accident, has increased. A monitoring system with the capability to monitor and discipline operators in a way that is fair and impartial would be key step in reducing this problem.

Currently, a variety of different control and coordination systems are utilized to monitor LRT systems. One basically utilized mechanism is train-to-wayside technology. In this system, the movement of LRVs in the LRT route grid is monitored by an embedded track sensor system. Generally, this technology has the capability to monitor some non-vital signal elements such as: announcements in a station that a train is coming; next-station messages onboard LRVs; and route selection at the terminal stations.

However, there are serious problems associated with the currently utilized TWC systems. Delays and significant maintenance costs have been incurred by city transit systems that utilize TWC, primarily related to the water infiltration of TWC circuit boards. For example, in areas of Houston where the TWC system was utilized, upon incidences of heavy rain, the streets would frequently fill with water which overflowed the curbs and covered the embedded track. The water would then seep through openings in the concrete, causing water damage to the circuit boards. As replacement boards for the TWC system cost approximately $1,000 each, the cost of annual maintenance upon metropolitan mass transit systems to repair and protect the TWC system from water damage became extremely high, a cost that will only grow as LRT routes and lines increase in number. In addition to the high maintenance costs associated with the currently utilized TWC system, it also suffers from an inability to monitor certain non-vital elements and does not provide the flexibility of changing detection zones as the monitoring zones are specifically tied to the specific tangible location of the embedded circuit boards. Accordingly, there is a need for an LRT monitoring and operating system which is capable of monitoring a wide variety of non-vital elements, while also eliminating embedded loops in the trackway and reducing the need for other wayside detection equipment.

SUMMARY OF THE INVENTION

Because of these and other problems in the art, described herein, among other things, is a GPS-based control and monitoring system for LRT systems which enables transit personnel to track vehicle positions, progress and non-vital signals as LRVs travel through their routes while eliminating the capital and maintenance costs associated with embedded LRT monitoring systems.

Accordingly, disclosed herein is a method for monitoring vehicle positions, progress and non-vital signals within a traffic grid, the method comprising: having one or more vehicles within a traffic grid, each vehicle having its own schedule; establishing one or more pre-defined detection zones within the traffic grid, each of the pre-defined detection zones having its own parameters and monitoring purpose; and determining when the one or more vehicles within the traffic grid have violated the parameters of the one or more pre-defined detection zones.

In one embodiment of this method, it is contemplated that the parameters of the one or more pre-defined detection zones can be modified to account for changing monitoring and tracking needs.

In another embodiment of this method, the information regarding pre-defined detection zone activity and progression of the one or more vehicles within the traffic grid will be displayed in real-time at centrally-located monitors.

In yet another embodiment of this method, the information regarding traffic flow patterns and violations of the one or more pre-defined detection zones will be reported and stored in a detailed log.

In still another embodiment of this method, at least one of the one or more pre-defined detection zones will be an advanced detection zone, wherein the advanced detection zone is located prior to a stop on a vehicle's route and, upon identifying a vehicle entering the advanced detection zone, a notification announcement is triggered.

In yet another embodiment of this method, at least one of the one or more pre-defined detection zones will be a stop bar overrun zone, wherein the stop bar overrun zone is located after a designated stop point on the vehicle's route and, upon identifying a vehicle entering the stop bar overrun zone at an improper time, the vehicle's violation is recorded.

In still another embodiment of this method, at least one of the one or more pre-defined detection zones will be a gate-closure zone, wherein the gate closure zone is located prior to an intersection with a gate on a vehicle's route and, upon identifying a vehicle entering the gate-closure zone, an instructional signal is sent to the upcoming gate to either open or close the gate prior to the vehicle's arrival.

In a further embodiment of this method, at least one of the one or more pre-defined detection zones will be a speed-governing zone, wherein the speed of a vehicle entering the speed-governing zone is detected and, if the speed is above a certain pre-defined velocity parameter, an instructional signal is sent to the operator of the vehicle to slow down the speed of the vehicle. It is contemplated that, when the speed of the vehicle is above a certain pre-defined velocity parameter when entering the speed-governing zone, a speed governor is activated to decrease the vehicle's speed.

In yet another embodiment of this method, at least one of the one or more pre-defined detection zones is a switch-track zone, wherein when the vehicle enters the zone an instructional signal is sent to switch an upcoming track on the vehicle's route.

It is contemplated that the parameters of each of the pre-defined detection zones in this method are chosen from the group consisting of: zone width, zone length, required vehicle speed and allowable heading variance.

Also disclosed herein is a method for establishing a plurality of pre-defined detection zones within a traffic grid, the method consisting of: recording a vehicle's route within a traffic grid with general systems manager software; opening the recorded vehicle's route with the general systems manager software at a central control center; selecting starting and ending points for one or more pre-defined detection zones on the vehicle's route within the traffic grid; assigning parameters for each of the selected pre-defined detection zones on the vehicle's route within the traffic grid; and assigning appropriate corrective actions for when a vehicle fails to meet the assigned parameters for each of the selected pre-defined detection zones on the vehicle's route within the traffic grid.

In addition, disclosed herein is a system for monitoring when a vehicle overruns a stop bar at an intersection within a traffic grid, the system comprising: a pre-defined detection zone located in a traffic grid after a stop bar at an intersection; wherein if a vehicle is detected within the pre-defined detection zone located in the traffic grid after the stop bar at an intersection when the stop bar is engaged, the system will determine that a violation has occurred; wherein when the system determines that a violation has occurred an alert will be sent through a network to a central control system; and wherein the central control system will record a log of the violation, the log including information chosen from the group consisting of: date of occurrence, time of occurrence, vehicle identification number, stop bar signal state, train speed and global satellite positioning strength. It is contemplated that this system may be configured to recognize and adapt to an inherent latency in the calculation and transfer of signals in the system.

BRIEF DESCRIPTION OF THE DRAWINGS

FIG. 4 provides an embodiment of a Signal Bar Overrun Report of the LRT monitoring and control system.

DESCRIPTION OF THE PREFERRED EMBODIMENTS

Figure 1:
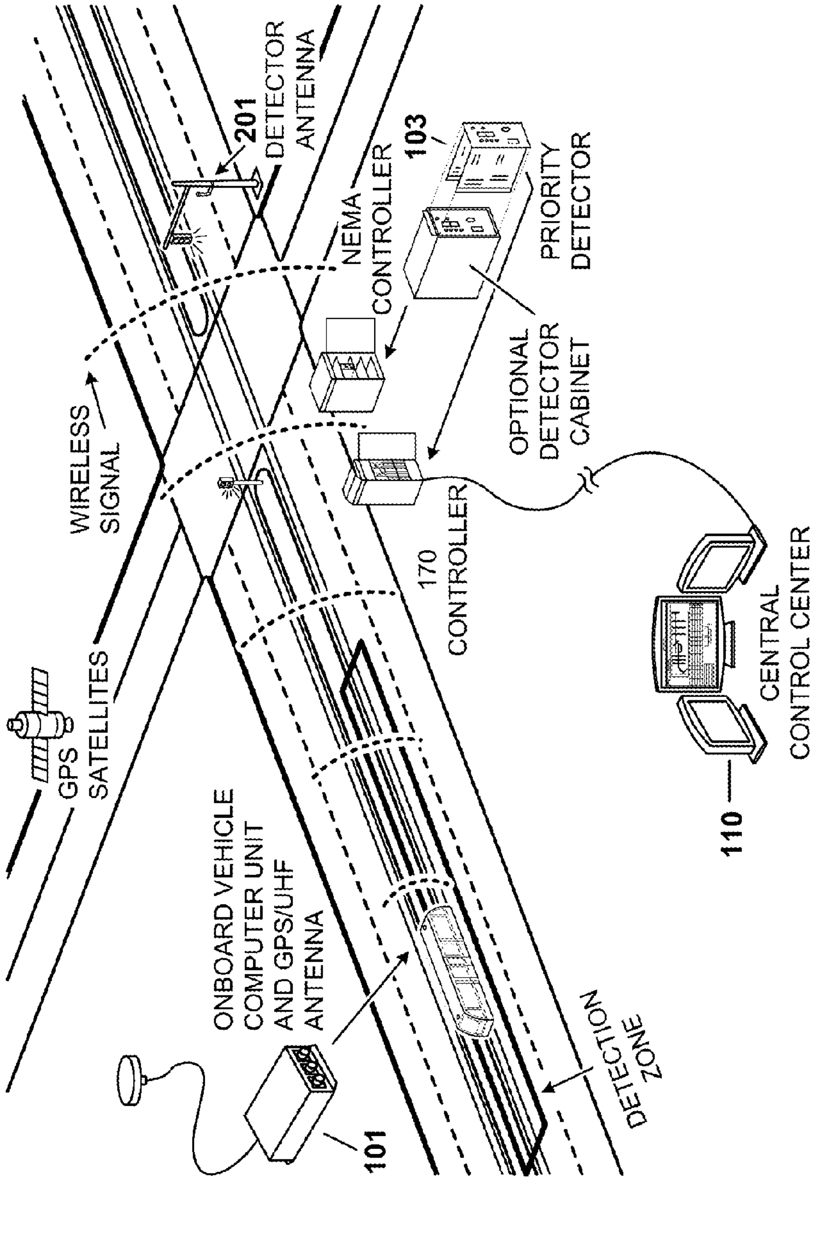
FIG. 1 provides a general overview of a street-view of the light rail vehicle monitoring and stop bar overrun system.

This disclosure is intended to teach by way of example and not by way of limitation. As a preliminary matter, it should be noted that while the description of various embodiments of the disclosed system will discuss application of the control and monitoring system of this application with light rail transit (LRT) systems, this in no way limits the application of the disclosed control and monitoring system to use in only LRT applications. Rather, any mass transit system which could benefit from the control and monitoring system described herein (including, without limitation, trains, metros, trams, streetcars, buses or other mass transit systems utilizing crossing signals including, but not limited to those using dedicated traffic lanes) is contemplated.

In a broad sense, the LRT monitoring and control system combines satellite position navigation systems and dead-reckoning technology with secure radio communications to accurately control and monitor LRT units, allowing transit personnel to track vehicle positions and progress as they travel through their routes. It is contemplated that, in certain preferred embodiments, the LRT monitoring and control system disclosed herein will run in conjunction with or function as a component of the estimated time of arrival (ETA) traffic control systems disclosed in U.S. Utility patent application Ser. Nos. 13/535,231 and 13/535,234, filed Jun. 27, 2012, the entire disclosures of which are incorporated herein by reference.

Generally, as LRT units move along their routes in the LRT monitoring and control system disclosed herein, they enter various pre-defined detection zones. Each of these various detection zones are pre-defined through the applicable global positioning system (GPS) technology and serve a distinct monitoring purpose in the overall system. These detection zones are adaptable; i.e., they can be modified and varied by transit personal to account for changing monitoring and tracking needs. Further, a certain set of parameters are defined for each of the detection zones. Zone parameters include, but are not limited to, minimum or maximum vehicle speeds, basic vehicle detection, vehicle direction en route, and the amount of space between vehicles within the traffic grid, amongst others. When a vehicle in a detection zone does not meet the defined parameters, a violation will be deemed to have occurred. In addition, the LRT monitoring and control system allows for the display of maps of LRT unit and intersection activity on centrally-located monitors or in the LRT unit in real time and for the creation of detailed logs and reports of traffic flow patterns, safety violations and activity in real time for monitoring personnel.

The LRT monitoring and control system described herein is generally structured as follows. In its basic form, the hardware components of the system include a vehicle equipment unit/vehicle computer unit (VCU) (101) installed in vehicles and a priority detector (103) installed in or near signal control cabinets (along with a cabinet- or pole-mounted antenna). As will be described further herein, the basic hardware components of the system (generally the VCU (101) and the priority detector (103)) generally communicate wirelessly using secure frequency hopping spread spectrum radio. The mobile-vehicle mounted hardware components, such as the VCU (101), utilize GPS or other known positioning technology to determine the precise real-time location of the VCU (101) and the vehicle to which it is attached at all times.

Generally, the VCU (101) is installed in a monitored vehicle in the traffic grid. As noted previously, contemplated monitored vehicles include, but are not limited to, mass transit vehicles (buses, trains, light rail, etc.), emergency vehicles (fire trucks, police cars, ambulances, etc.), waste management vehicles, and road maintenance vehicles. It should be understood that the system disclosed herein contemplates the installation of one or more VCUs (101) in various vehicles traveling and operating in the traffic grid.

Generally, the VCU (101) serves several functions in the disclosed LRT monitoring and control system. For example, the VCU (101) determines the real-time location data for the vehicle in which it is installed. Further, the VCU (101) also is capable of sending information regarding its velocity, location and ETA to other components of the system to which it is communicatively attached, including a remote traffic control center (102), a plurality of secondary control centers (106), a plurality of other VCUs (101), and a plurality of priority detector units (103). In addition, the VCU (101) is also capable of receiving information from these other components in the system. Finally, the VCU (101) is capable of determining the location of the vehicle with respect to a plurality of pre-defined detection zones within the grid.

The VCU (101) generally contains a receiver for a satellite positioning navigation system. Generally, any satellite positioning system known to one of ordinary skill in the art is contemplated including, but not limited to, the Global Positioning System (GPS), the Russian Global Navigation Satellite System (GLONASS), the Chinese Compass navigation system and the European Union's Galileo positioning system. Further, any receiver technology known to those of skill in the art that is able to calculate its position by precisely timing the signals sent by satellites is a contemplated receiver in the disclosed system. The installation of the receiver can be either permanent, by direct integration into the light rail vehicle (LRV), or temporary, through a mobile receiver that can be taken into and removed from the LRV. Generally, the receiver of the VCU (101) functions to determine the LRV's position, direction and velocity in real time at any given point during its travels. Further, in certain embodiments, the receiver of the VCU (101) will be utilized to define the detection zones and criteria for the detection zones for a given LRV route. In alternative embodiments, it is contemplated that the VCU (101) will determine its position, direction and velocity through inertial navigation systems known to those of ordinary skill in the art alternatively or in addition to through satellite positioning driven systems. Contemplated inertial navigation systems include, but are not limited to, dead reckoning, gyroscopic instruments, wheel rotation devices, accelerometers, and radio navigation systems.

In addition to a receiver, the VCU (101) also contains a vehicle computer which is capable of transferring the location data, coordinates and speed of the LRV and the parameters of detection zones to a central control center (110) or a specific priority detector(s) (103) at a specific intersection. Another component of the VCU (101) is a radio transceiver. Generally, any device for the transmission and receiving of radio signals including but not limited to the FHSS and/or FH-CDMA methods of transmitting radio signals is contemplated.

Notably, throughout this disclosure, the term "computer" will be used to describe hardware which implements functionality of various systems. The term "computer" is not intended to be limited to any type of computing device but is intended to be inclusive of all computational devices including, but not limited to, processing devices or processors, personal computers, work stations, servers, clients, portable computers, and hand-held computers. Further, each computer discussed herein is necessarily an abstraction of a single machine. It is known to those of ordinary skill in the art that the functionality of any single computer may be spread across a number of individual machines. Therefore, a computer, as used herein, can refer both to a single standalone machine, or to a number of integrated (e.g., networked) machines which work together to perform the actions. In this way the functionality of the vehicle computer may be at a single computer, or may be a network whereby the functions are distributed. Further, generally any wireless methodology for transferring the location data created by the VCU (101) to either the central control center or particular priority detectors is contemplated in this disclosure. Contemplated wireless technologies include, but are not limited to, telemetry control, radio frequency communication, microwave communication, GPS and infrared short-range communication.

Another component of the VCU (101), in certain embodiments, is a combination GPS/UHF antenna. In the embodiment with the combination antenna, the combo GPS/UHF antenna contains the antennas for both the transceiver and the GPS unit. Notably, however, this combo antenna is not required and in other embodiments two separate antennas can be utilized. Generally, the combo antenna or separate antennas will be mounted on the top of the LRV, although this location is not determinative. Further, in certain embodiments, the antenna will be connected to the VCU (101) by two coax cable connections (one for UHF and one for GPS) although any method for connecting the antenna(s) to the VCU (including both wired and wireless technologies) is contemplated.

Generally the VCU (101) will be programmed with preferred vehicle response settings, applicable intersections, the vehicle's schedule, a map of the overall grid, and vehicle detection zones for applicable signal lights in the grid. In certain embodiments, it is contemplated that the VCU will include a user interface known to those of ordinary skill in the art. Among other things, this user interface will provide a view of the map of the overall grid, vehicle detection zones for applicable signal lights in the grid, and the location of other VCU-equipped vehicles in the grid.

In one embodiment, the VCU (101) will be powered directly by the LRV battery. In other embodiments, the VCU (101) will be powered by a portable power unit known to those of skill in the art including, but not limited to, batteries and solar panels. Further, in other embodiments, the VCU (101) will be powered by the general power system employed by the overall LRT system.

A second component of the LRT monitoring and control system described herein is a plurality of priority detector units (103). The priority detector units (103) of the disclosed LRT monitoring and control system generally function to modify and control the associated signal light based upon the velocity, location, coordinates, ETA and priority signals of VCU-equipped LRVs in the traffic grid.

The priority detector units (103) will generally be located at or near particular intersections and signal controllers in the area controlled by the disclosed system. In one embodiment, each priority detector (103) will be collocated within a particular signal light controller cabinet. However, this location is not determinative. It is contemplated that the priority detector (103) may be located at any proximity near a particular signal light that allows the priority detector (103) to receive applicable signals from either the remote traffic control center (102), secondary control centers (106), other priority detector units (103) and/or the VCUs (101) and allows the priority detector (103) to send signals to the signal controller (105) to modify the phases of the respective signal light at the intersection that it monitors.

One component of the priority detector units (103) is the intersection antenna (201). This antenna (201) is any antenna known to those of skill in the art that is capable of receiving radio or other electromagnetic signals. In one embodiment, the antenna will be co-located with the priority detector (103). In other embodiments, the antenna will be located at a position removed from the priority detector (103). Generally, it is contemplated that the intersection antenna (201) may be located at any place near the applicable intersection that would allow for the effective transmission and receipt of signals. For example, in certain embodiments it is contemplated that the intersection antenna (201) will be externally mounted on a signal light pole at the intersection. In one embodiment, the intersection antenna (201) will be connected to the priority detector unit (103) by wire connections, in one embodiment by a coax cable connections (e.g., for UHF). In another embodiment, the intersection antenna (201) will be connected wirelessly to the priority detector unit (103) in a manner known to those of ordinary skill in the art.

Further, different embodiments of the priority detector unit (103) include a shelf-mount version or a rack-mount version. In one embodiment of the rack-mount version, is it contemplated that the priority detector unit (103) will be able to be inserted directly into two adjoining card slots of a NEMA detector rack or Model 170 card file. However, it should be noted that any priority detector unit (103) design known to one of ordinary skill in the art that is able to perform the functionality described in this application is contemplated.

The priority detector unit (103) will generally send a variety of outputs using the standard North, South, East and West discreet outputs for a signal controller (105) based on the LRV's geographical zone position in order to request signal priority for an approaching LRV or for a priority vehicle including a priority unit which may be substantially identical to an LRV. It may also include other geographical or virtual detection zones.

Another component of the LRT monitoring and control system also generally located in the traffic cabinet is a high-speed data adapter. The high speed adaptor assists in the communication of output signals between the priority detector (103) and the signal controller (105). While any high-speed adapter known to one of ordinary skill in the art is contemplated, in one embodiment it is contemplated that the adaptor can use RS232, SDLC, Ethernet or other protocols to receive and output the large number of signals (such as ETA calls for each direction) from the priority detector (103) to the signal controller (105).

Generally, the priority detector unit (103) of the LRT monitoring and control system is capable of sending a variety of output calls to the signal controller (105) with which it is associated.

Generally, the VCUs (101), priority detectors (103) and central control center (110) of the LRT monitoring and control system will be connected by a wireless technology known to those of skill in the art that allows for the free transfer of data and information between each of these components through a control network (104). The network (104) communicatively connects the different components of the system.

Another component of the LRT monitoring and control system is the central control center (110). Generally, the central control center (110) is a central server; i.e. a computer or series of computers that links other computers or electronic devices together. Any known combination or orientation of server hardware and server operating systems known to those of skill in the art for servers is contemplated as the central control center (110). In one embodiment of the system, the central control center (110) is linked to the VCUs (101) and the priority detectors (103) of the system by a wireless network that allows for the free transmission of information and data there-between allowing monitoring and configuration of a number of priority detectors (103). In another embodiment of the system, the central control center (110) will be linked to the priority detectors by a wired network.

In a broad sense, the LRT monitoring and control system disclosed herein, is generally capable of reporting a vehicle's speed, distance and location (amongst other locational-defining variables) using fixed geographic detection methodologies. Further, in additional embodiments, the system can be structured and customized to modify the detection zones that will be utilized to monitor and control the LRV while traveling in the LRT grid.

In a fixed geographic detection method, the LRT monitoring and control system utilizes a satellite positioning navigation system, such as GPS, to create virtual "loops," also known as detection zones, which are set up at specific defined points along a vehicle's route. As vehicles equipped with a VCU (101) enter and pass through these detection zones, dependent upon the conditions and parameters of the detection zone, certain actions are taken. In certain embodiments, it is contemplated that the detection zone and response data will be stored in the VCU (101) as well as be sent to the central control center (110).

These geographical or virtual detection zones can be set-up at various points along the LRT transit route in order to handle positive train control functions; i.e., to report vehicle locations and activity in real time through the route and to alert drivers and/or to govern vehicle actions based on programmed parameters and the detected violations thereof. Unlike certain prior art systems, these detection zones are not limited to areas where tangible circuit boards are located.

Figure 3:
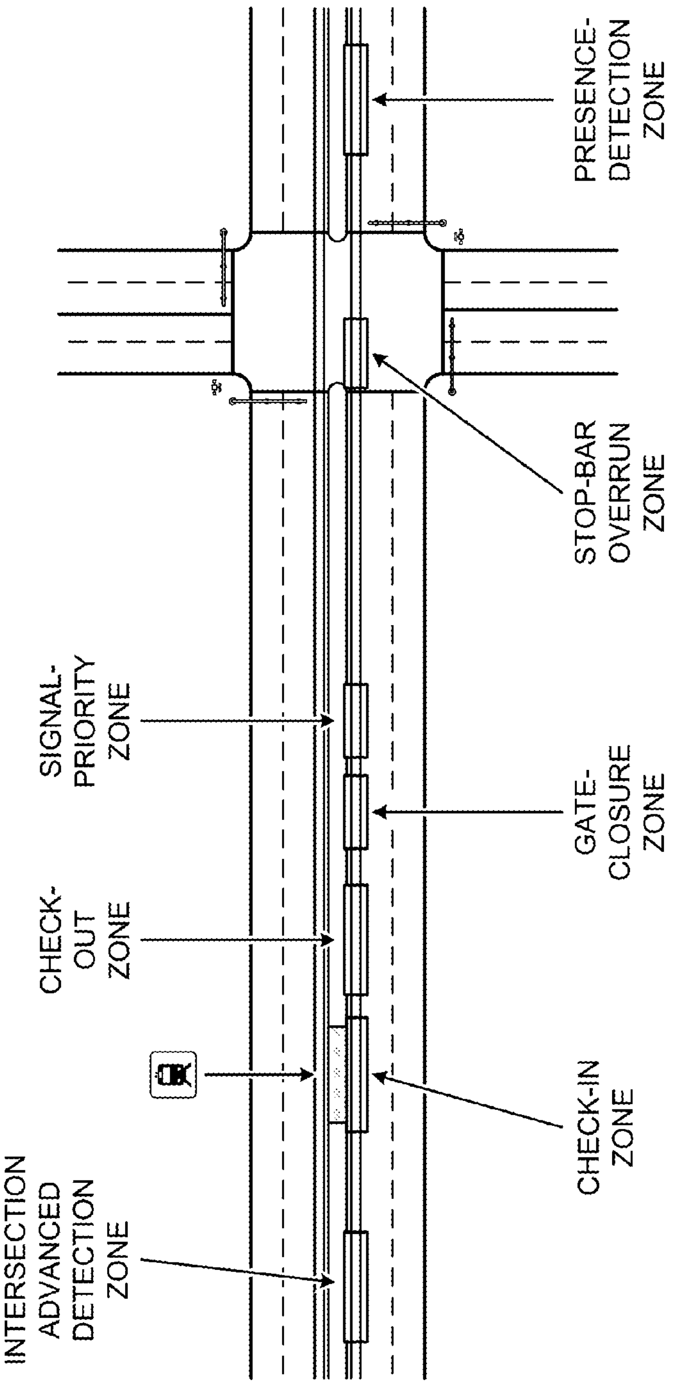
FIG. 3 provides a diagram of a series of possible detection zones which can be set-up in the light rail vehicle monitoring and stop bar overrun system.

Examples of types of detection zones which can be set up by transit authority with the present LRT monitoring and control system include, but are not limited to, the following types of zones, some of which are provided in FIG. 3. The intersection advanced detection zone is a zone which generally functions to maintain the coordination of upcoming traffic signals at intersections. The parameters for these advanced detection zones generally include the detection of a vehicle within the zone. A "violation" of these advanced detection zones will have been deemed to occur when a vehicle is detected within the advanced detection zone. These advanced detection zones can also be utilized for the activation of station and on-board announcements of arrival times for the LRV. In this functionality, once the advanced detection zone is reached by the LRV, and confirmed by the GPS, a signal is transmitted to the control network which, in one embodiment, utilizes the information contained in the signal to coordinate the upcoming lights on the LRV's scheduled route. This signal can also be utilized by the control network (104) to activate an announcement of the arrival time of the LRV at the upcoming stations on the route. Similarly, when the advanced detection zone is reached and confirmed by the GPS, a signal transmitted to the VCU (101) activates an on-board next-station announcement which is made by the LRV internal PA system. As demonstrated in FIG. 3, intersection detection zones are generally located at a point in an LRV's scheduled route at some point prior to an intersection.

The check-in zone is a zone which generally functions to notify the central control center (110) that a train is at a designated stop. Generally, the check-in zones are located on a route at the designated stop, as seen in FIG. 3. However it is contemplated, in certain embodiments, that the beginning of the check-in zone can precede the platform of the designated stop and the end of the check-in zone can extend beyond the end of the platform of the designated stop. Similar to the advanced detection zone, signals sent to the traffic network (104) from an LRV reaching this stop can initiate announcements either at the station platform and/or in the internal LRT PA system.

The check-out zone is a zone which generally functions to notify the central control center (110) that a train has left a designated stop. Generally, the check-out zone will be located at some point on a route at a reasonable distance after the designated stop. In embodiments where there is both a check-in zone and a check-out zone, the check-out zone will be located at a point somewhere on the route after the check-in zone. Similar to the advanced detection zones, the parameters for these check-in and check-out zones generally include the detection of a vehicle within the zone. A "violation" of these check-in and check-out zones will have been deemed to occur when a vehicle is detected within the respective check-in or check-out zones.

The gate-closure zone of the system generally acts as a backup to close the crossing gate controls at upcoming intersections. Accordingly, as demonstrated in FIG. 3, the gate-closure zones of the system are generally located on an LRV's route prior to an upcoming intersection at a point that provides sufficient time for the central control center, wayside detector or some other detector system known to those of ordinary skill in the art to receive the signal transmitted to it the from the LRV entering the gate closure zone and send an instructional signal to the upcoming gate prior to the LRV's arrival.

The speed-governing zone generally functions to detect an LRV's speed upon entering the zone. The parameters for these speed-governing zones generally include either a minimum or maximum vehicle speed within the zone. A "violation" of these speed-governing zones will have been deemed to occur when it is determined that a vehicle within the speed-governing zone is either above or below the minimum or maximum vehicle speed parameter defined for that zone. It is contemplated that these zones may be located at any point along an LRV's route in the system where it is desirable to monitor, and have the option of controlling, the LRV's speed. For example, if it is determined that an LRV is going too fast upon entering one of these speed-governing zones, a signal can be sent to the VCU (101) to modify/slow down the speed of the LRV. Examples of areas where such zones would be desirable include, but are not limited to, areas of a route near schools, pedestrian crossings, shopping districts, commercial districts or other areas where heavy pedestrian and/or vehicle traffic is expected. In one embodiment of this zone, if an LRT unit is traveling too fast as detected by this zone and determined in the central control center (110), the system can activate an applicable speed governor to decrease the LRV's speed.

The signal-priority zone generally functions to request priority at a signal light through an upcoming intersection. When an LRV arrives at the signal priority zone, a priority call is made to the applicable traffic priority controller through the detector unit, requesting priority for the LRV. Once the LRV leaves the applicable intersection, the priority request discontinues, enabling the signal controller to return to a normal traffic control cycle. Because these zones are intimately tied to the functioning of signal lights at an upcoming intersection, they are generally located at a point on an LRV's route at a sufficient distance prior to an intersection to allow for the signal to precipitate a change in the signal light prior to the arrival of the LRT unit.

Figure 2:
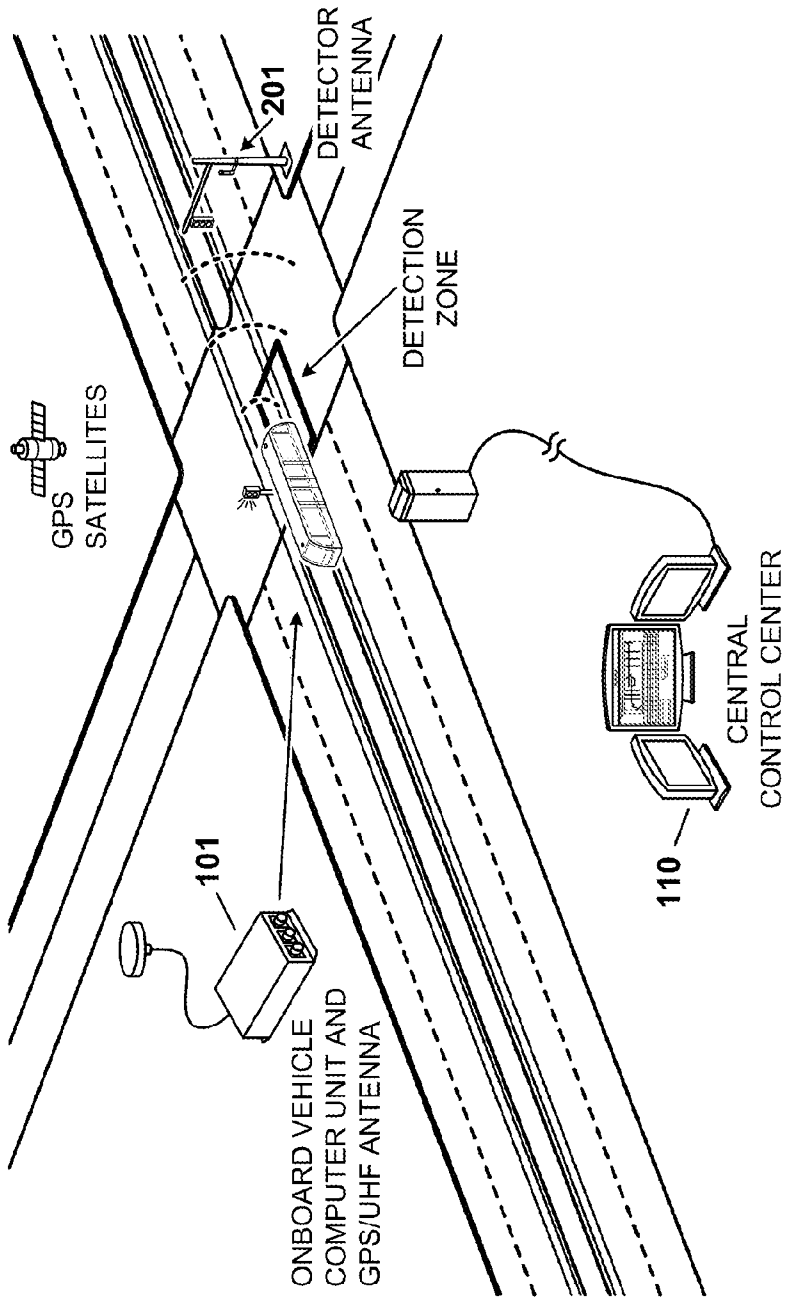
FIG. 2 provides a perspective view of a stop bar detection zone in the light rail vehicle monitoring and stop bar overrun system.

The stop bar overrun zone generally functions to monitor specified safety violations at stop bars or other intersection control systems, including hypothetical intersection stopping points based on the location of an intersection and the flow of traffic. The parameters for these stop bar overrun zones generally includes the detection of a vehicle within the zone. A "violation" of these stop bar overrun zone will have been deemed to occur when a vehicle is detected within the stop bar overrun zone. An embodiment of a stop bar overrun detection zone in the LRT monitoring and control system is provided in FIG. 2. As demonstrated in FIGS. 2 and 3, the stop bar overrun zone is generally located on a route in the intersection, at some point after the stop bar. By this location, the zone can detect when a given LRV has gone over or "overrun" the stop bar. Stated differently, if the LRV is detected within the stop bar overrun zone when the stop bar or other intersection control system is engaged, the system will know that a violation of the stop bar has occurred. Thus, the VCU (101) determines the status of the stop bar signal and, through the use of GPS, determines if the LRV has passed or "overrun" the stop bar and stop bar signal during a period when the stop bar was down; i.e., when the LRV was in actuality supposed to stop at the stop bar and not proceed into the intersection as detected by the zone. If the system determines that a specified safety violation has occurred, such as overrunning an intersection stop signal, the time and LRV number will be recorded by the system and an alert will be sent through the network (104) to the central control system (110) and the LRT monitoring and control system will record a log of the improper LRV activity. A Signal Bar Overrun Log can then be created by the LRT monitoring and control system which includes a detailed report of, amongst other things: date and time of occurrence; train ID; direction of travel; route and cross streets; intersection and zone IDs; bar signal state (as well as preceding and subsequent signal states); alarm sounded; train speed and GPS satellite strength. In one embodiment, the central control computer will display a pop-up message on the display interface to notify personnel when an overrun has occurred. An embodiment of a Signal Bar Overrun Log is provided in FIG. 4. This particular detection zone and functionality of the LRT monitoring and control system provides a method through which transit operators can impartially identify and discipline LRV operators who violate stop bar signals.

Figure 8:
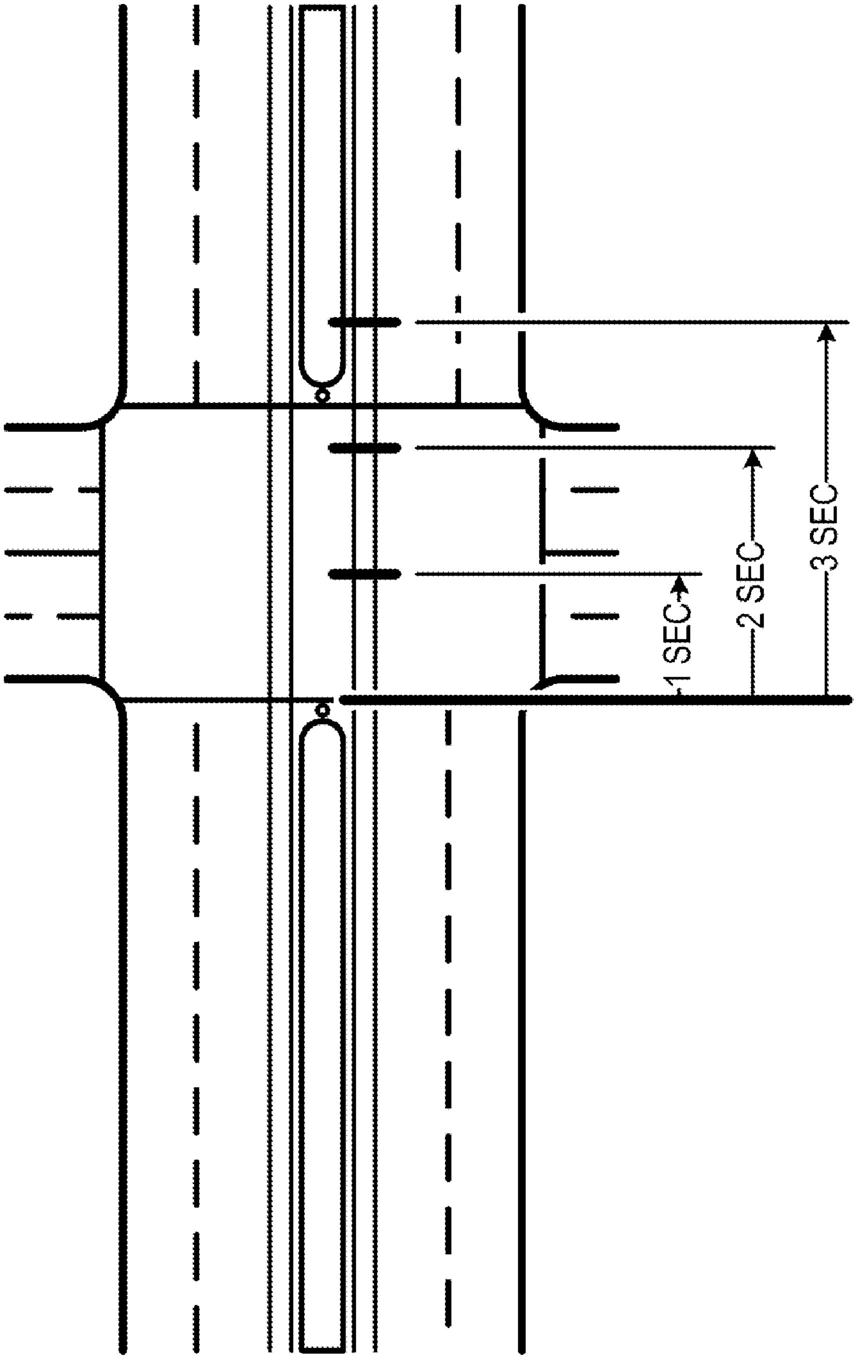
FIG. 8 provides an example of the inherent latency period experienced for stop bar overrun detection zones.

In certain embodiments of the system, the system will be configured to recognize and adapt to the inherent latency in the determination of the location of a vehicle in the grid as well as the transfer of signals from the VCU (101) to the central control system (110) or other component parts of the network (104). These latencies will generally be referred to herein collectively as overrun offset. Generally, when monitoring instances of trains overrunning intersection stop bars, there is a delay in the time the position data information is determined and calculated as well as the time the position data information is transmitted to the system via the network (104). Commonly, the latency period is about two to three seconds (though it may vary by location). For a train travelling 30 mph, this amount of latency could result in raw location data that is off by as much as 90 feet, as demonstrated in FIG. 8. Thus, to ensure accurate location data and reporting of stop bar overruns, it is contemplated that the system will offset the raw location data received for the stop bar overrun by a defined average latency period.

The presence-detection zone generally activates when an LRV is within the zone and notifies the central control center of the LRV's location. This type of detection zone is often used to notify the transit network when an LRT unit has passed an intersection. As such, as demonstrated in FIG. 3, in certain embodiments this zone is located at some point after an intersection on the LRV's route.

Another detection zone is the headway zone. This zone functions to calculate the distance between LRT units in order to maintain the proper spacing between the LRT units. The parameters for these advanced detection zones generally include a minimum amount of allowable spacing between LRT vehicles. A "violation" of these headway zones will have been deemed to occur when the defined minimum amount of allowable spacing between LRT vehicles is not met. For example, if the defined minimum parameter is 4,000 feet and two LRT units are within 3,500 feet of each other, the LRT monitoring and control system can take measures to slow the following LRV to achieve the proper headway between it and the preceding LRV. Similar to the speed-governing zones, when vehicles are sensed as too close together via headway zones, the system can activate an applicable speed governor to modify the one or more applicable LRV's speeds to regain the desired distance between LRVs. Generally, it is contemplated that these zones may be located at any point along the LRV's route.

Another detection zone, the switch-track zone, functions to send a request for the rail-control cabinet to switch tracks for the LRV based upon scheduling or a request authorized by the central control system (110). The parameters for these switch-track zones generally include the detection of a vehicle within the zone. A "violation" of these switch-track zones will have been deemed to occur when a vehicle is detected within the switch-track zone. Generally, these switch-track zones are located at or near the intersection of two or more tracks or at or near a switch-track zone on the LRV's route. Also generally located at this point along an LRV's route is the wrong detection zone. This zone functions to alert the transit network (104) when a train has entered the wrong track. Generally, with this detection zone the LRT monitoring and control system immediately sends a signal to the LRV operator, the operator of any oncoming LRVs on the same track and the central control center (110) alerting them to the position of the LRV on the wrong track. With this detection zone, if the LRVs get within a specified distance of each other, the LRT monitoring and control system can activate a dead-man switch and shut down the corresponding LRVs.

Another contemplated detection zone is the reverse running detection zone. Depending on the circumstances, there are certain periods of time when sections of a track or route in a LRT grid will have to be altered from their normal course to run in a reverse direction. Examples of such instances include, but are not limited to, reversing the direction to allow for track maintenance or to provide for additional vehicles in the grid due to special events. In these circumstances, zones may be established and set-up to trigger alerts if the LRV operator attempts to enter a "reverse run" section of the track going the wrong direction. The parameters for these reverse running zones generally include the detection of a vehicle within the zone. A "violation" of these reverse running zones will have been deemed to occur when a vehicle is detected within the reverse running zone. For example, the detection zone can be set up immediately prior to the portion of the "reverse run" section of the track where, traditionally, an LRV would enter. Thus, with the reverse running detection zone, upon entering the zone operators of the LRV could be notified that they were entering this section of the route from the wrong direction. It is contemplated that these alerts may be displayed and/or sounded at the central control center (110) and/or within the LRV such that corrective action could be immediately taken. It is contemplated that the reverse run zones may overlay an entire block of track or they may be set up at each end of the reverse run block.

Yet another contemplated detection zone in the disclosed LRT monitoring and control system are virtual moving blocks. These "virtual moving blocks" are used to ensure that trains adhere to agency-defined block spacing. These moving blocks travel with their assigned LRVs and the block lengths automatically adjust based on train speed (or as calculated by braking algorithms). When the front or back of the defined moving block detects another LRV, an alert can be sent to either the operators of the respective LRVs encroaching upon each other or the central control center (110). It is also contemplated that these virtual moving blocks can be set up to send alerts when confirmation is not received about upcoming switch positions. By sending an alert when LRVs breach their agency pre-defined spacing levels, the virtual moving blocks operate to avoid both head-on and rear-end collisions, which may occur if a LRV has stopped or slowed down. Both situations will trigger an alert based on an algorithm in the VCU (101), which calculates for potential collisions based on the LRV's speed, distance and direction.

It is contemplated that detection zones may be set-up either at street-level, within the LRV, or centrally at the central control system (110). Generally, the associated systems manager software enables personnel to proceed on the LRV while running a laptop connected to the VCU (101). At key points, zone start and stop points may be designated and associated parameters may be entered. Parameters include, but are not limited to, zone width, required vehicle speed, and allowable heading variance. In addition, certain vehicle parameters can be set up to serve as conditions for activating the appropriate or desired zone response. For example, a minimum velocity can be set up for a speed-governing zone. If the LRV is above this speed when entering the speed-governing zone, the system can notify the LRV operator of this inappropriate activity, log this improper activity and/or activate an applicable speed governor to slow down the speed of the LRV. In the embodiment in which the detection zones are set-up at street level, in a first step a zone-setup wizard in the VCU is activated. After activation, a default zone width and heading variance is selected. Then, in a next step, the applicable route and cross streets are entered. Then, once the vehicle drives over a point where the operator desires the zone to begin, the user selects the current location of the LRT unit as their starting point. After the starting point is entered, a directional code is entered and the zone heading is entered automatically. Next, once the LRT unit drives over the point where the operator desires the zone to end, the user selects the current location as their ending point. Then the operator commands the setup wizard to create the zone and the newly created zone is added to the LRT monitoring and control system database. The parameters of the database can be modified and changed at an alternate time if required.

In the embodiment in which the zones are created at the central control system (110), general systems manager software is also utilized. In this methodology, the default heading variance and zone width are set with the general systems manager software at the central control system (110). In a first step with this software, while driving pre-defined routes, paths are recorded with the general systems manager software. Then, after driving the routes, the recorded paths are opened in the systems manager software program. After a given recorded path is opened, an intersection center point and the starting and ending points for each zone are selected. Further, desired parameters and pre-conditions can be set up for each of the respective zones. Once selected, the various created detection zones will be displayed on the systems manager software. Any edits to the zones will be modified in this view in real-time. In a third embodiment, zone set-up will occur at the central control (110) by designating key points (e.g., zone start, zone finish) strictly through the use of integrated GPS maps.

Figure 6:
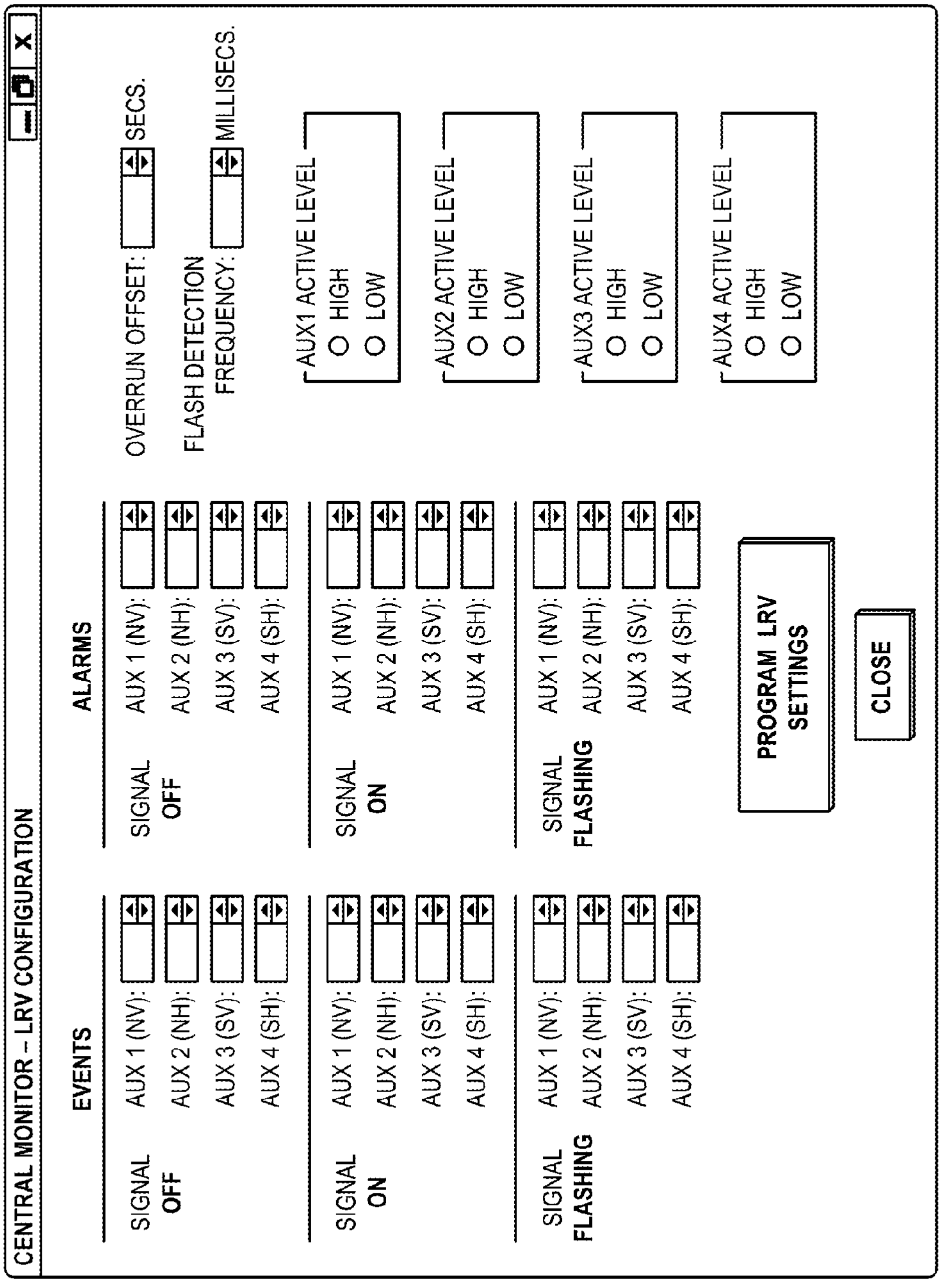
FIG. 6 and FIG. 7 provide an embodiment of an interface utilized by the systems manager software to set up the pre-defined detection zones.
Figure 7:
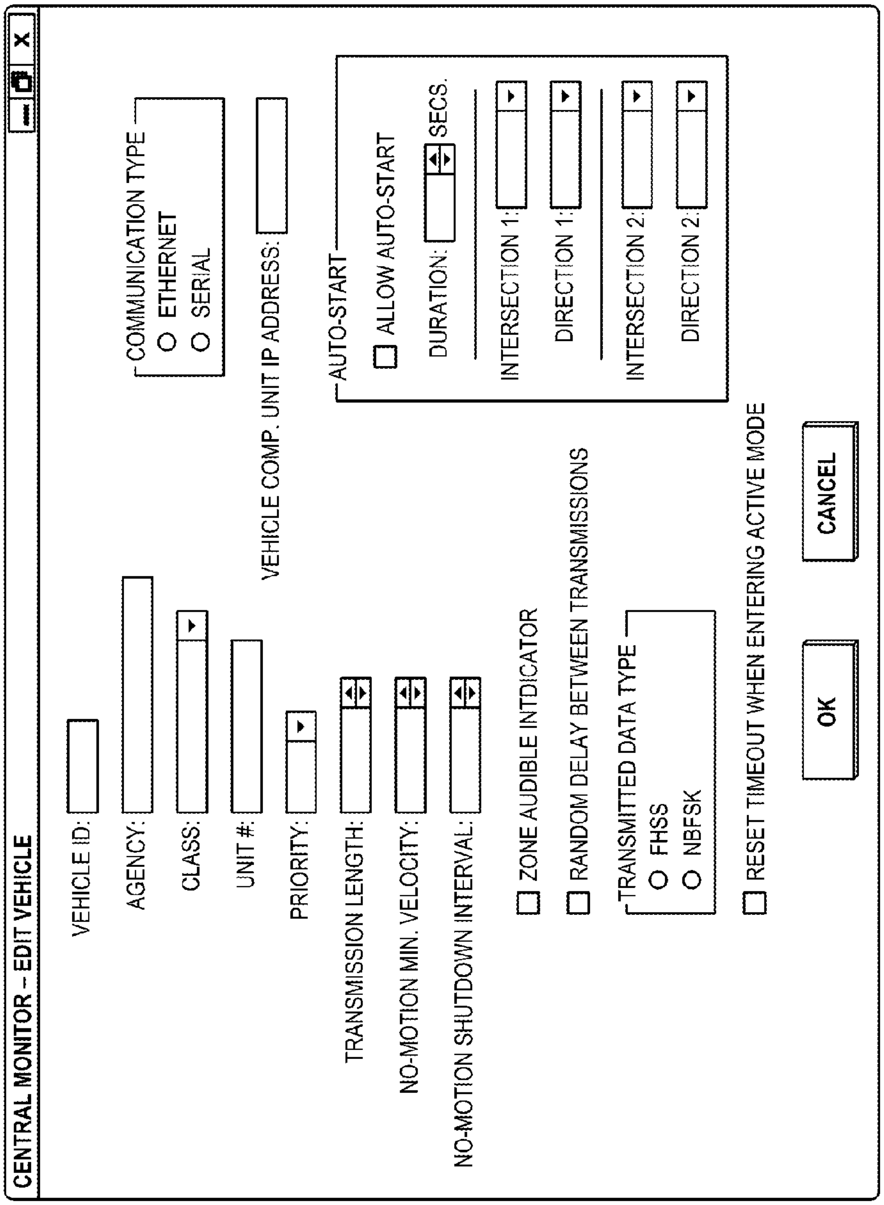

An example of an embodiment of an interface utilized by the systems manager software—both at the street level or at the central control system—to control how outputs regarding signals and pre-defined zones in the system are exchanged is provided in FIGS. 6 and 7. As noted previously, the overrun offset field is used in conjunction with the stop bar overrun zone to adapt the system for the common latency period inherent in signal transference to ensure accurate location data and accurate reporting of stop bar overruns.

In alternative embodiments, it is contemplated that the detection zones of the LRT monitoring and control system can be enhanced through the use and installation of electromagnetic tags, such as RFID tags. It is contemplated that these electromagnetic tags may be installed at wayside locations to enhance vehicle-position accuracy. In these embodiments, electromagnetic tag readers are installed on each of the respective LRVs in the system. When the vehicle passes over an installed tag, the VCU (101) recognizes its position and triggers the appropriate alert for the detection zone or wayside location. For example, a tag installed at a LRV stop bar would prompt a violation alert if it is activate by a vehicle crossing the stop bar against the signal. Depending upon the embodiment, it is contemplated that these electromagnetic tag components of the system can either work independently to prompt alerts or in combination with detection zones of the LRT monitoring and control system described herein to augment the accuracy of that system.

Generally, the communication and information exchange between the components of the disclosed the LRT monitoring and control system generally functions as follows. The GPS receiver of the vehicle control unit (101) located in the LRT unit, through inputs received from an applicable satellite system, determines the speed, direction, velocity and other pertinent geographic and coordinate information for the vehicle in all monitored approaches. Then, either constantly or at fixed time intervals (i.e., based upon defined detection zones), the vehicle computer of the VCU (101) transmits the raw applicable geographic and coordinate information for the LRV to the central control center (102).

Figure 5A:
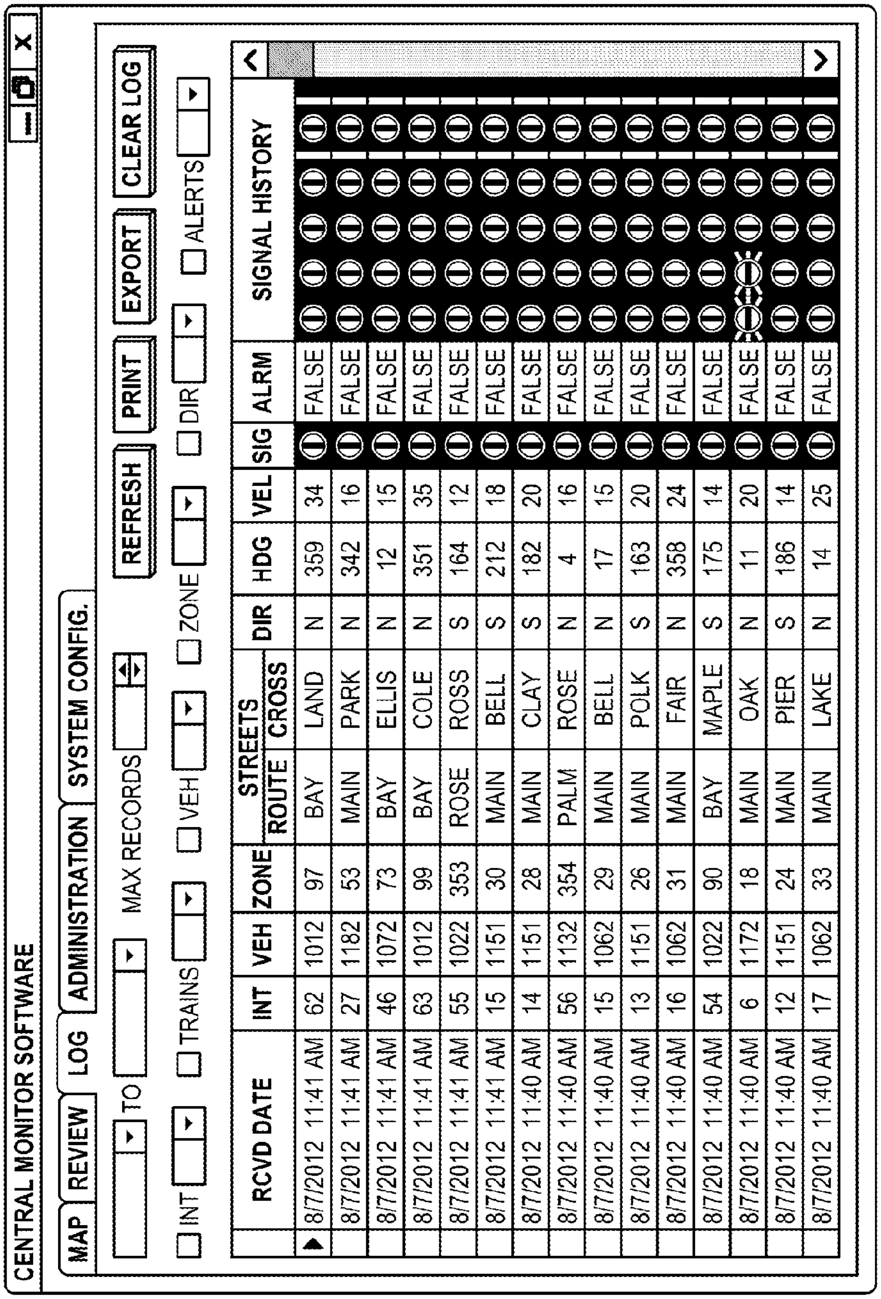
FIG. 5*a* provides an embodiment of the on-screen table of a central monitor software log and FIG. 5*b* provides an embodiment of a general grid monitoring map of the LRT monitoring and control system.
Figure 5B:
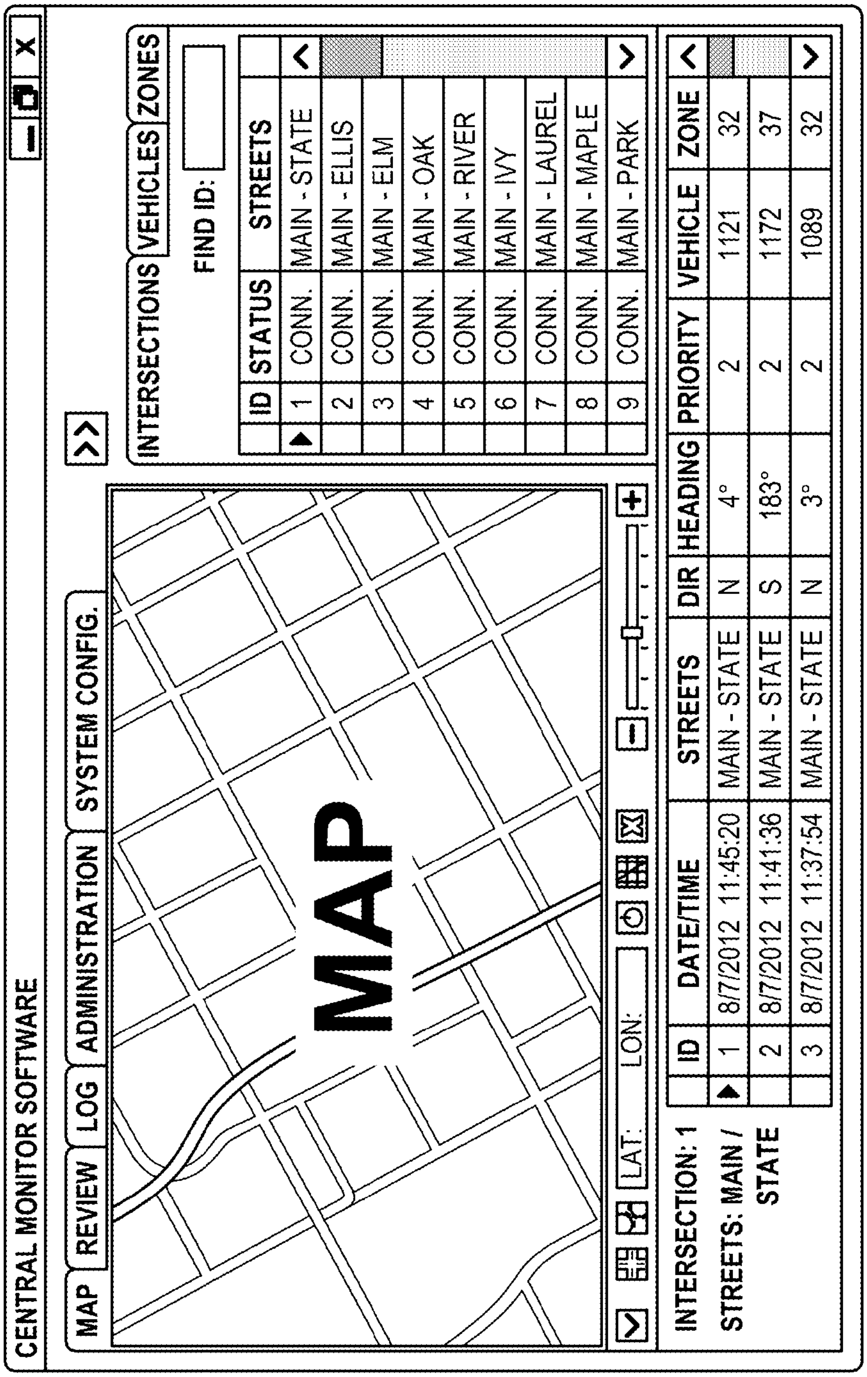

As noted previously, in one embodiment of the central control center (110) there will be provided a central monitor which provides transit operators and authorities the capability of monitoring LRV location and activity in real-time. In one embodiment, when an LRV enters a detection zone under pre-defined conditions, the central monitor logs the LRV activity data on an on-screen table. Generally, any of the zones along a route can be set up to report into the log table. In another embodiment, the position of the LRV in the LRT system will consistently be displayed in real time The following offers an example regarding how the present LRT monitoring and control system, central control center (110) and detection zone log work together in one embodiment. First, as a particular LRV moves forward, it enters an advanced detection zone. Once within the zone, i.e., once the zone becomes active, the LRV transmits the advance detection signal to the upcoming traffic controller. In addition, the transmitted vehicle data is displayed in the on-screen activity log. Then, when the LRV enters the "at station" zone, the transit network is notified of its location and the entry of its coordinates appears in the activity log. As the LRV advances, each zone carries out its defined function and the applicable activity data is entered into the logged on screen. If an LRV runs past a stop bar (as detected by the stop bar zone and central control system (110)), the occurrence is highlighted on the activity log, an alarm is sent to the transit network and the vehicle activity data is logged into the on-screen table. An embodiment of the on-screen table and the general grid monitoring map are provided in FIG. 5.

As demonstrated by the description offered above, the LRT monitoring and control system allows for the free transmission of signals and information between and among the components of the system. Among other functions, this allows for the reduction of operating and maintenance costs for non-vital signal elements on street-running LRT systems. Because the system is generally software-based and scalable, it provides for ease of modification and adjustment over time. Further, the system also has the capability to significantly reduce both capital and maintenance costs while also improving system performance and passenger safety. In addition, the system offers significant flexibility for placement of future stations or for responding to changes caused by outside influences since it eliminates the need for tangible and fixed in-pavement circuits. Also, the GPS and dead reckoning aspects of the present system address operator error issues, solve existing maintenance problems and even prevent some future problems. Finally, the LRT monitoring and control system's use of GPS and dead reckoning ensures full compatibility of LRT units on all transit routes and lines by eliminating dependence on a particular signals or vehicle vendors.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A method for monitoring vehicle positions, progress and non-vital signals within a traffic grid, the method comprising:

having one or more vehicles within a traffic grid, each vehicle having a published schedule;

establishing one or more pre-defined detection zones within the traffic grid, each of the pre-defined detection zones having its own parameters and monitoring purpose; and determining when the one or more vehicles within the traffic grid have violated the parameters of the one or more pre-defined detection zones.

2. The method of claim 1, wherein the parameters of the one or more pre-defined detection zones can be modified to account for changing monitoring and tracking needs.

3. The method of claim 1, wherein information regarding pre-defined detection zone activity and progression of the one or more vehicles within the traffic grid is displayed in real-time at centrally-located monitors.

4. The method of claim 1, wherein information regarding traffic flow patterns and violations of the one or more pre-defined detection zones is reported and stored in a detailed log.

5. The method of claim 1, wherein at least one of the one or more pre-defined detection zones is an advanced detection zone, wherein the advanced detection zone is located prior to a stop on a vehicle's route and, upon identifying a vehicle entering the advanced detection zone, a notification announcement is triggered.

6. The method of claim 1, wherein at least one of the one or more pre-defined detection zones is a stop bar overrun zone, wherein the stop bar overrun zone is located after a designated stop point on the vehicle's route and, upon identifying a vehicle entering the stop bar overrun zone at an improper time, the vehicle's violation is recorded.

7. The method of claim 1, wherein at least one of the one or more pre-defined detection zones is a gate-closure zone, wherein the gate closure zone is located prior to an intersection with a gate on a vehicle's route and, upon identifying a vehicle entering the gate-closure zone, an instructional signal is sent to the upcoming gate to either open or close the gate prior to the vehicle's arrival.

8. The method of claim 1, wherein at least one of the one or more pre-defined detection zones is a speed-governing zone, wherein the speed of a vehicle entering the speed-governing zone is detected and, if the speed is above a certain pre-defined velocity parameter, an instructional signal is sent to the operator of the vehicle to slow down the speed of the vehicle.

9. The method of claim 7, wherein when the speed of the vehicle is above the certain pre-defined velocity parameter when entering the speed-governing zone, a speed governor is activated to decrease the vehicle's speed.

10. The method of claim 1, wherein at least one of the one or more pre-defined detection zones is a switch-track zone, wherein when the vehicle enters the zone an instructional signal is sent to switch an upcoming track on the vehicle's route.

11. The method of claim 1, wherein the parameters of each of the pre-defined detection zones are chosen from the group consisting of: zone width, zone length, required vehicle speed and allowable heading variance.

12. A method for establishing a plurality of pre-defined detection zones within a traffic grid, the method consisting of:

recording a mass transit vehicle's route within a traffic grid with general systems manager software;

opening the recorded mass transit vehicle's route with the general systems manager software at a central control center;

selecting starting and ending points for one or more pre-defined detection zones on the mass transit vehicle's route within the traffic grid;

assigning parameters for each of the selected pre-defined detection zones on the mass transit vehicle's route within the traffic grid; and assigning appropriate corrective actions for when a mass transit vehicle fails to meet the assigned parameters for each of the selected pre-defined detection zones on the mass transit vehicle's route within the traffic grid.

13. A system for monitoring when a vehicle overruns a stop bar at an intersection within a traffic grid, the system comprising:

a pre-defined detection zone located in a traffic grid after a stop bar at an intersection;

wherein if a mass transit vehicle is detected within the pre-defined detection zone located in the traffic grid after the stop bar at an intersection when the stop bar is engaged, the system will determine that a violation has occurred;

wherein when the system determines that a violation has occurred an alert will be sent through a network to a central control system; and wherein the central control system will record a log of the violation, the log including information chosen from the group consisting of: date of occurrence, time of occurrence, vehicle identification number, stop bar signal state, speed and global satellite positioning strength.

14. The system of claim 13, wherein the system is configured to recognize and adapt to an inherent latency in the calculation and transfer of signals in the system.

* * * * *